Oct. 9, 1962 R. W. HATFIELD 3,057,306
ON-TRACK TRUCK CARRIAGES
Filed July 1, 1960 2 Sheets-Sheet 1
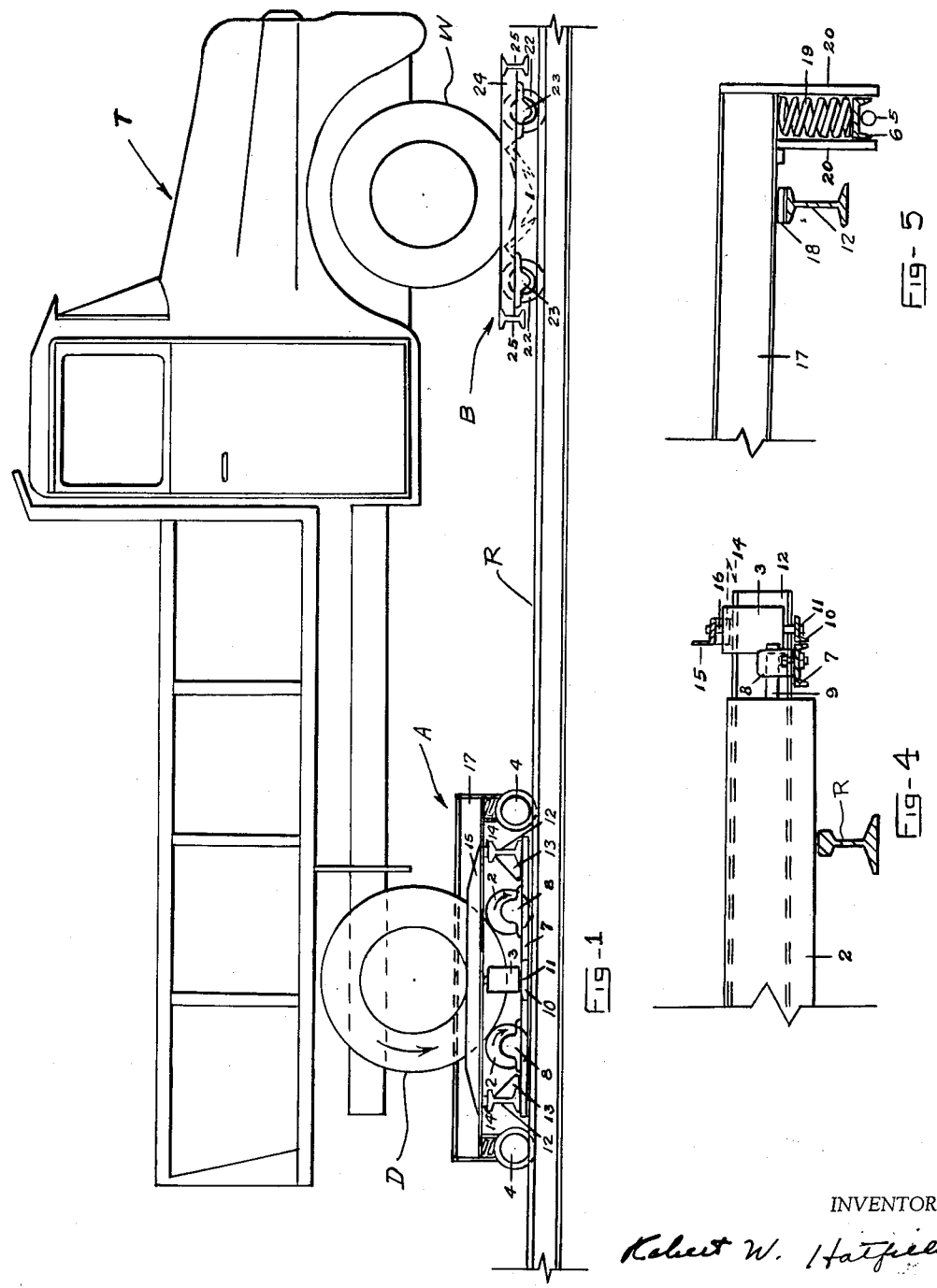
INVENTOR
Robert W. Hatfield
BY Cushman, Darby & Cushman
ATTORNEYS Oct. 9, 1962
R. W. HATFIELD
3,057,306
ON-TRACK TRUCK CARRIAGES
Filed July 1, 1960
2 Sheets-Sheet 2
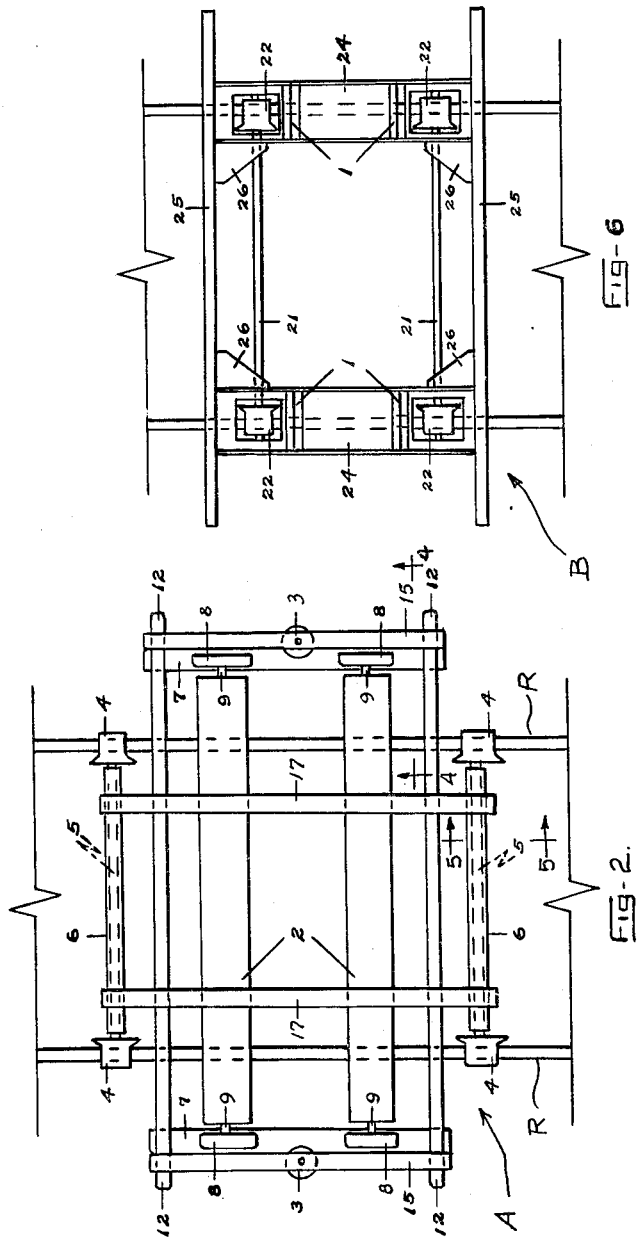
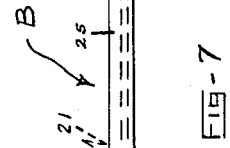
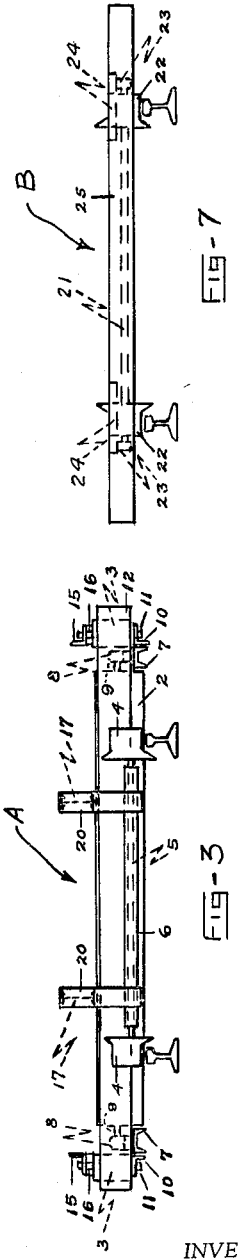
INVENTOR
Robert W. Hatfield
BY Cushman, Darby & Cushman
ATTORNEYS United States Patent Office 3,057,306
Patented Oct. 9, 1962

3,057,306
ON-TRACK TRUCK CARRIAGES
Robert W. Hatfield, Woodbine, Md., assignor to Harry T. Campbell Sons' Corporation, Towson, Md., a corporation of Maryland
Filed July 1, 1960, Ser. No. 40,280
5 Claims. (Cl. 105—159)

The present invention relates to improvements in apparatus for supporting automotive vehicles on railway track structures and, more particularly, to improvements in apparatus which is driven on the track structure through the rotation of the driving wheels of the motor vehicle.

The location of an area where maintenance or installation of track structure is being accomplished often times is not readily accessible by roads for transportation of personnel, materials or equipment. To facilitate the movement of personnel, material or equipment to particular track location, apparatus have been heretofore designed whereby an automotive vehicle such as a truck or the like may be driven onto the apparatus and the apparatus moved over the existing track structure to the desired area. A specific example of the use of such apparatus or truck carriages for receiving an automotive vehicle and transporting it by its own power to the site, is the use of dump trucks filled with railway ballast or the like. The truck can be driven up a ramp onto the truck carriage and then utilizing the truck's power driven along the rails to the site where the ballast is to be dumped. Other examples of the use of such devices is for the transportation of trucks or other vehicles carrying materials such as crossties, rails or the like, the material being transported to the area of use along the previously laid railway track structure. Of course, there are many other uses where it is highly desirable to transport a conventional automotive vehicle along a railway track structure, the device utilizing the power of the vehicle to drive the same along the rails.

The devices heretofore used for transporting an automotive vehicle along a railway track structure have been in effect small railway cars onto which the automotive vehicle is driven. Complicated means have been provided for utilizing the power of the vehicle to drive the device supporting the vehicle on the railway track structure. In some instances the wheels of the automotive vehicle had to be removed and replaced with gears whereas in other instances belts or chain drives movable by the wheels of the vehicle supported on the device were provided for turning wheels of the device.

A primary object of the present invention is to provide an improved type of apparatus for supporting an automotive vehicle of various lengths and widths, the apparatus utilizing independent truck carriages for supporting the front and rear wheels of the vehicle.

Another object of the present invention is to provide an improved apparatus for supporting an automotive vehicle on the rails of a railway track structure, the apparatus utilizing an improved means of driving the same by the automotive vehicle's power unit.

Still another object of the present invention is to provide an improved truck carriage capable of supporting the driving wheels of an automotive vehicle, the truck carriage having means thereon for engaging the driving wheels of the automotive vehicle while they are rotating so as to prevent lateral movement of the vehicle with respect to the carriage.

A further object of the present invention is to provide a truck carriage for supporting the driving wheels of an automotive vehicle on the rails of a railway track structure, the device having an improved direct drive between the driving wheels of the vehicle and the rollers carried by the device for driving the same along the track structure.

Another object of the present invention is to provide apparatus for supporting a vehicle for movement on a railway track structure, the apparatus being simple and inexpensive to manufacture, and light weight in construction, so that it may be moved from one track structure to another.

These and other objects and advantages of the present invention will appear more fully in the following specification, claims and drawings, in which:

FIGURE 1 is a side elevational view of the apparatus of the present invention illustrated supporting a vehicle of the dump truck type on a railway track structure;

FIGURE 2 is a top plan view of the rear truck carriage which supports the driving wheels of the vehicle;

FIGURE 3 is an end elevational view of the rear truck carriage illustrated in FIGURE 2;

FIGURE 4 is an enlarged fragmentary sectional view taken substantially on the line 4—4 of FIGURE 2, portions of the structure being omitted for purposes of clarity;

FIGURE 5 is an enlarged fragmentary sectional view taken on the line 5—5 of FIGURE 2, portions of the structure being omitted for the purpose of clarity;

FIGURE 6 is a top plan view of the front truck carriage of FIGURE 1 which is adapted to support the non-driven wheels of the vehicle; and FIGURE 7 is an end elevational view of the truck carriage illustrated in FIGURE 6.

Referring now to the drawings, wherein like characters or reference numerals represent like or similar parts, FIGURE 1 illustrates the present invention supporting a dump truck generally designated at T on the rails R of a railway track structure. The apparatus of the present invention includes a rear truck carriage generally designated at A and a front truck carriage generally designated at B. The rear truck carriage is adapted to support the driving wheels D of the motor vehicle T whereas the front truck carriage B is adapted to support the steering wheels or non-driven wheels W of the motor vehicle T. When it is desired to use the apparatus, the rear truck carriage A is placed on the track structure next to a suitable wooden ramp (not shown.) Then the front truck carriage B is placed on the track structure in a position immediately adjacent the rear truck carriage A. Motor vehicle T is then driven up the ramp with its front wheels passing over the rear truck carriage A onto the front truck carriage B. Continued movement of the vehicle will move the front truck carriage B along the rails R away from the rear truck carriage A until such time that the rear wheels D of the vehicle T are positioned on the rear truck carriage A. When the vehicle has assumed the position on the carriages A and B as shown in FIGURE 1 it is ready for movement on the rails R. By utilizing the power plant of the vehicle T to rotate the driving wheels of the vehicle in a reverse direction, the vehicle will move forward as the carriage A is frictionally driven in a forward direction on the rails R. Of course, the front carriage B follows the rails of the track structure and supports the non-driven wheels W.

The rear truck carriage A includes a substantially rectangular shaped frame structure comprising a pair of I-beam members 12 which represent the end members and a pair of inverted channel shaped members 7 which represent the side frame members. Gusset plates 13 attached to the web of the inverted channel members 7 and the I-beam members 12 by welding or the like give added rigidity and strength to the rectangular shaped frame structure. The members 12 have a length substantially greater than the distance between the rails R of the track structure so that the rectangular frame structure has sufficient width to accommodate the tread of the vehicle to be supported.

A pair of bearing blocks or pillows 8 are rigidly supported in spaced apart relationship on the upper surface of the web of each of the inverted channel members 7. The bearing blocks 8 on one channel member 7 are aligned with the bearing blocks 8 on the other channel member 7 and a pair of rollers 2 having axles 9 are adapted to be supported by the bearing blocks 8 as best shown in FIGURES 2 and 3. The rollers 2 are spaced apart longitudinally of the frame structure a distance sufficient to receive the driving wheels of the vehicle medially therebetween so that the driving wheels rest on the rollers' peripheries. Since the rollers 2 also contact the track structure on their periphery, rotation of the driving wheels will frictionally rotate the rollers to cause the carriage A to move along the rails.

Each of the inverted channel members 7 is provided on its outer flange at a midpoint of the length thereof with a short section of angle iron plate 10. A pair of elongated angle iron members 15 are each rigidly supported at their ends to the top flanges of the I-beam members 12 adjacent the ends thereof. One angle member 15 extends over the plate 10 on one side of the frame structure in spaced relationship thereto whereas the other angle member 15 extends over the other plate 10 on the other side of the frame structure. Spacer blocks 14 may be provided between the members 15 and the top flange of the I-beam members 12 so as to increase the distance between the members 15 and their respective plates 10. A pair of vertical rollers 3 are supported on each side of the frame structure between the members 10 and 15 as best shown in FIGURES 1, 2 and 4, the rollers 3 having their upper axle 16 received in the angle iron member 15 whereas their lower axle 11 is received in the lower angle iron plate 10. Vertical rollers 3 are freely rotatable and are adapted to engage the outer side of the tires of the driving wheels to prevent transverse movement of the vehicle on roller 2.

A pair of I-beam members 17 extend longitudinally of the frame structure and are rigidly secured to the top flanges of the end members 12 as best shown in FIGURES 2 and 3. The members 17 which are parallel and spaced from each other and inwardly from the members 15 provide means for supporting axles 5 of flanged rail engaging guide wheels 4. In more detail, the members 17 are supported on the top flange of the end members 12 with a filler block 18 interposed therebetween to give the necessary height to the structure. At the ends of each of the members 17 there is provided a pair of guide plates 20 depending downwardly therefrom. The guide plates 20 are parallel to each other and extend in a direction transversely of the frame structure and are adapted to receive an inverted channel shaped member 6. A spring interposed between the lower flange of the member 17 and the upper surface of the web of the inverted channel shaped member 6 normally urges an axle 5 for the wheels 4 downwardly. As will now be evident, the frame structure which includes the parallel end members 12, parallel side members 7 and flanged wheel support members 17 may move as a unit vertically with respect to the axle 5 and the inverted channel member 6 against the action of the compression spring 19. The guides 20 retain the springs 19 in their vertical position.

As will now be evident, when the driving wheels D of the motor vehicle T are positioned on the carriage A they will rest medially on the periphery of the rollers 2. The weight of the vehicle T will cause the entire frame structure including the rollers 2, to move downwardly with respect to the flanged guide wheels 4 until such time that the rollers 2 bear against the rails R of the track structure. By rotating the drive wheel in a reverse direction, the rollers 2 are frictionally caused to rotate in a forward direction so that the vehicle T can move forward along the track. The vertical rollers 3 bear against the side walls of the tires of the driving wheels D and prevent any lateral movement of the wheels with respect to the rollers 3 especially when the vehicle is going around a curve on the track structure.

The front carriage truck B includes a pair of spaced parallel channel shaped members 24 connected at their ends in spaced relationship to each other by a pair of parallel I-beam members 25 so as to form a substantially rectangular frame structure. The channel shaped members 24 are provided with cut-out portions in each of their webs adjacent their ends for receiving the upper portion of flanged wheels 22. The flanged wheels 22 are mounted on front and rear axles 21 which are supported at their ends by bearing blocks or pillows 23 carried on the bottom surface of the web of the channel shaped members 24. The top surface of the web of the channel members 24, intermediate each pair of wheels 22 is provided with chock members 1 which are adapted to engage the wheels W of the vehicle T midway of the front and rear flanged wheels 22. Gussets or plate members 26 are welded between the flanges of the channel members 24 and the I-beams 25 so as to reinforce the frame structure.

As will be evident from the above description, once the front wheels W of the vehicle T are positioned between the chocks 1 of the front truck carriage B and the rear wheels D are positioned on the rollers 2 of the rear truck carriage A, the vehicle can be easily moved along the track structure by utilizing the vehicle's own power plant. By rotating the wheels D in a reverse direction, forward movement of the truck carriage A results as there is direct friction drive between the wheels D and the rollers 2. The front non-driven wheels W will be carried along by the front truck carriage member B as the unit is driven by the rear truck carriage A. Brakes of the vehicle T may be applied to slow and stop the unit by slowing and stopping the rollers 2. Transverse movement of the rear wheels D is prevented as the freely rotatable rollers 3 bear against the sides of the wheels D. The front wheels, of course, fit within the flanges of the channel shaped members 24 and thus there will be no transverse movement of the front of the vehicle with respect to the carriage B.

By providing separate carriages A and B, a light weight apparatus is achieved for use in converting a road vehicle to a vehicle for movement on a railway track structure. The separate units or carriages A and B are sufficiently light to permit them to be removed from one track structure and placed on another track structure. Another advantage of providing separate carriages A and B is that the apparatus is adaptable for use with any length of vehicle as the carriages can be positioned relative one another underneath the wheels of the vehicle.

In situations where the motor vehicle has more than one pair of non-driven wheels then extra carriages such as the carriage B may be placed under such non-driven wheels to support the same. An example of such a vehicle would be the conventional tractor-trailer vehicle, wherein the wheels of the trailer could be supported by carriages such as carriage B and the driving wheels of the tractor could be supported by a carriage such as the carriage A.

It is thus seen that the objects and advantages of this invention have been fully and effectively accomplished by the apparatus illustrated in the drawings and described hereinbefore. However, the foregoing specific embodiments of the device are subject to some changes without departing from the principles of the invention involved. For this reason the terminology used in this specification is for the purpose of description and not limitation, the scope of the invention being defined in the appended claims.

I claim:

1. In combination: a motor vehicle having a pair of non-driven wheels at one end thereof and at least a pair of driving wheels spaced longitudinally therefrom; and means to support and move said vehicle on rails of a railway track structure, said means including a first carriage truck comprising a frame structure for supporting said pair of non-driven wheels and tandem pairs of flanged wheels rotatably journaled on said frame structure for engagement with the rails of said track structure, a second carriage truck independent of said first carriage truck for supporting said pair of driving wheels, said second carriage truck including a frame structure, tandem pairs of flanged wheels rotatably journaled in said second carriage truck frame structure for engaging the rails of the track structure, a pair of horizontally extending elongated rollers arranged in tandem intermediate the tandem pairs of flanged wheels of said second carriage truck, said horizontally extending rollers each being arranged to engage the rails of the track structure and to receive the driving wheels of said vehicle medially between the same so that the driving wheels engage the periphery of each of the rollers.

2. The combination of claim 1 wherein said tandem pairs of flanged wheels of said second carriage truck are resiliently mounted with respect to the frame structure thereof whereby the frame structure and said horizontal rollers may move vertically with respect thereto upon receiving the driving wheels of the vehicle so that the horizontal rollers bear against the rails of the track structure.

3. The combination defined in claim 1 including a pair of rollers carried by the frame structure of said second carriage truck and rotatable about a vertical axis, said vertical rollers being spaced apart transversely of the frame structure of said second carriage truck and arranged intermediate the tandem pairs of flanged wheels thereof whereby said rollers bear against sidewalls of the pair of driving wheels of said vehicle to thereby limit lateral movement of the vehicle with respect to the horizontal rollers.

4. In combination: a motor vehicle having a pair of non-driven wheels at one end thereof and at least a pair of driving wheels spaced longitudinally therefrom; and means to support and move said vehicle on rails of a railway track structure, said means including a first carriage truck comprising a frame structure for supporting said pair of non-driven wheels, and a pair of flanged wheels rotatably journaled on said frame structure for engagement with the rails of said track structure; a second carriage truck independent of said first carriage truck for supporting said pair of driving wheels, said second carriage truck comprising a frame structure, tandem pairs of flanged wheels mounted thereon for engagement with rails of the track structure, spring means to support said tandem pairs of flanged wheels for vertical movement with respect to said frame structure, a pair of horizontally extending elongated rollers arranged in tandem intermediate the tandem pairs of flanged wheels on said second carriage truck, said horizontally extending rollers being journaled in said frame structure and arranged to engage the rails of the track structure and to receive the driving wheels of said vehicle medially between the same so that the driving wheels engage the periphery of each of the rollers, and a pair of vertical rollers journaled on said frame structure about a vertical axis, said vertical rollers being arranged on each side of said frame structure intermediate said horizontally extending rollers and adapted to engage side walls of said pair of driving wheels to thereby limit lateral movement of the vehicle with respect to said horizontal rollers.

5. The combination defined in claim 4 wherein said first carriage truck frame structure includes pairs of chocks arranged to receive said pair of non-driven wheels medially therebetween.

References Cited in the file of this patent
UNITED STATES PATENTS

| | | |
|---|---|---|
| 1,880,126 | Fageol | Sept. 27, 1932 |
| 1,973,267 | Rabey | Sept. 11, 1934 |
| 2,154,139 | Schmol | Apr. 11, 1939 |
| 2,154,140 | Schmol | Apr. 11, 1939 |
| 2,171,093 | Klima et al. | Aug. 29, 1939 |
| 2,751,854 | Pedersen | June 26, 1956 |
| 2,905,104 | Bounds | Sept. 22, 1959 |
| 2,915,989 | Hoppe et al. | Dec. 8, 1959 |